E. BONNEAU.
TRANSMISSION MECHANISM.
APPLICATION FILED JAN. 17, 1908.
942,882.
Patented Dec. 14, 1909.
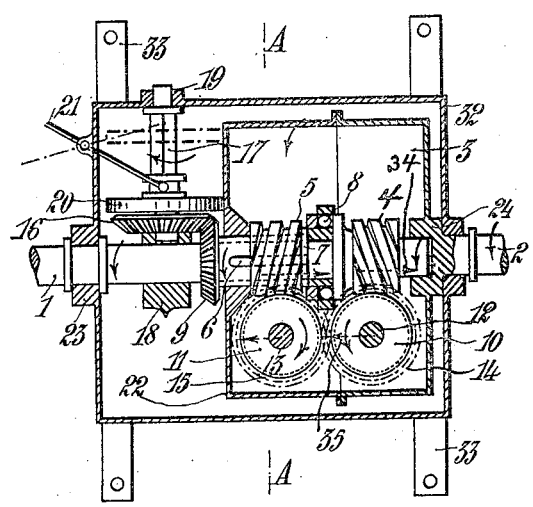
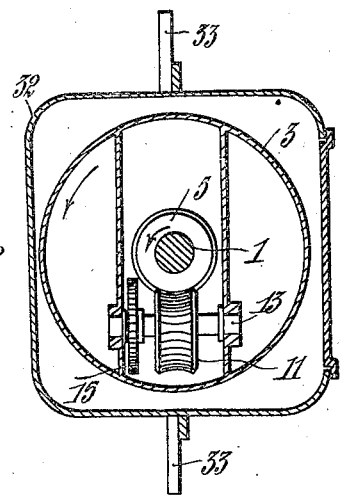
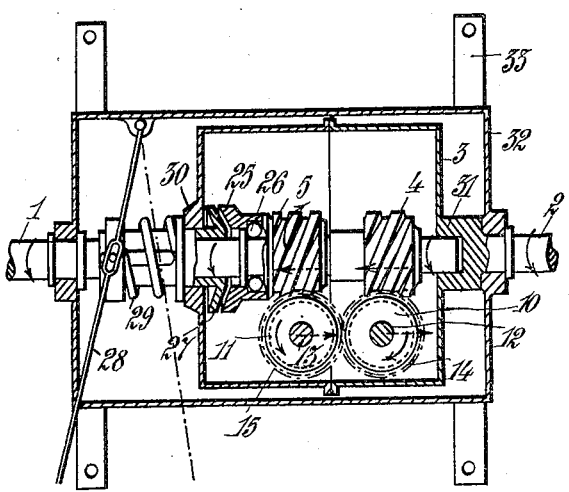

UNITED STATES PATENT OFFICE.

EDME BONNEAU, OF BREST, FRANCE.

TRANSMISSION MECHANISM.

942,882.

Specification of Letters Patent.     Patented Dec. 14, 1909.

Application filed January 17, 1908.   Serial No. 411,293.

*To all whom it may concern:*

Be it known that I, EDME BONNEAU, a citizen of the French Republic, and residing at Brest, France, have invented certain new and useful Improvements in Transmission Mechanism, of which the following is a specification.

This invention relates to a construction of transmission mechanism more particularly applicable to motor-cars, characterized by the power of the engine being transmitted to the driving axle of the vehicle by mechanical means chiefly consisting of a gear not normally differential but capable of being rendered so at will by a small effort by means of a special progressive device, so that the proportion of angular velocities of the two spindles connected by the said differential movement, can be gradually varied, and any speed between the highest and the lowest obtained, one of the said spindles, driven by the engine, having a practically constant speed, while the other one which operates the driving spindle of the vehicle can have a variable speed.

In the accompanying drawings:—Figure 1 is a plan, in horizontal cross-section, of the whole of the mechanism comprising a device with a friction disk, intended to bring about the differential movement; Fig. 2 is a side elevation, in vertical section on line A—A of Fig. 1, showing the arrangement of the movable cylindrical casing of the mechanism and the wheels: Fig. 3 is another view, in plan and horizontal cross-section, of a modified construction of the whole mechanism, the differential movement in this construction being obtained by means of a device with friction cones.

With reference to Figs. 1 and 2, the spindle 1 is driven by the engine, and the spindle 2 has a variable speed and transmits the movement to the driving axle and is secured to the cylindrical casing 3 of the mechanism. A non-reversible worm 4 is keyed to the spindle 1 and another worm 5 of the same pitch, but of the opposite direction to that of the worm 4, is mounted by means of a key 6 on a sleeve 7, the latter being left free on the spindle 1, and provided with a series of balls 8. The pitch of the said two worms is equal and of opposite hand. The sleeve 7 is mounted loosely on the spindle 1 and is secured to a small conical pinion 9. Two worm wheels 10 and 11 engaging respectively with the worms 4 and 5, are mounted on two spindles 12 13 supported in bearings provided inside the cylindrical casing 3. Two toothed wheels 14 15 engaging with each other, are mounted on the spindles 12 13 of worm wheels 10 and 11 and secure the two worms 4 5 to each other in their movement. The variation of the speed which can be obtained by this apparatus depends on the proportion between the diameters of the said two wheels 14 and 15. A bevel pinion 16 of the same diameter as the pinion 9 with which it engages, is keyed to the end of a small spindle 17 arranged at a right angle to the spindle 1 in suitable bearings 18 19. A friction disk 20 is mounted so as to be able to slide longitudinally, on a square portion of the spindle 17, so that it can be moved on the same by means, for instance, of a lever 21, so as to bring the said disk in different positions on the friction disk 22 constituted by the front end of the cylindrical casing 3 of the mechanism. The spindle 1 rests, on the one hand, in a bearing 23, and on the other hand, with its end in a step bearing 24, supported by the back portion of the movable cylinder 3 forming the casing of the mechanism, the said cylindrical casing being secured to the spindle 2.

In the construction shown in Fig. 3, the two worms 4 and 5, are of the same hand, the worm 5 is mounted loosely direct on the spindle 1 and carries a female friction cone 25 as well as a ball bearing 26. A male friction cone 27 is mounted on the spindle 1, so as to be held against the rotation of the said spindle and is adapted to be moved longitudinally on the same by means of lever 28. A spring 29 is arranged so as to bring about a gradual pressure of the male cone 27 against the female cone 25 by means of the lever 28 and to produce gradually the differential movement. In this construction (similarly to the construction in Fig. 1), the cylindrical casing 3 rests, on the one hand, with the boss 30 on the sleeve of the male cone 27, and on the other hand with the part 31 in the case 32 inclosing the whole mechanism, and secured to the chassis of the car, by means of lugs 33. The working of this mechanism is as follows: The arrows in full lines show the movement of the parts, the dotted arrows show the reactions. It must be first of all pointed out that, owing to the movement of the different parts and of the reactions which they cause, these latter form a couple having the tendency on the one hand, to press the spindle 1 in the direction of the arrow 34, and the movable cylinder 3 with the spindle 2 in the direction of the arrow 35, which brings about an automatic friction of the disk 20 on the disk 22. The friction disk 20 has a radius equal to its nearest distance from the axis of the spindle 1, in that position the friction circumference on the disk 22 is equal to the development of the disk 20 and consequently, during the rotation, the bevel pinions, 9, 16, have the same angular velocity as the spindle 1, and the differential mechanism is inoperative. This occurs by reason of the fact that although the worm 4 fixed on the driving shaft tends to rotate the worm wheel 10 which in turn by means of the gear wheels 14 and 15 tends to rotate the worm wheel 11, yet this latter cannot rotate the worm 5 because of course no worm wheel can rotate its worm unless the latter be of an exceedingly great pitch. Consequently as some movement is bound to take place, the box 3, together with the two worm wheels, the two gear wheels and the worm 5, rotates bodily with the shaft 1, and therefore the driven shaft rotates at the same speed as the driving shaft. If, however, by means of the lever 21, the friction disk 20 is then progressively brought into the positions more and more distant from the spindle 1, the speed of rotation of the disk 20 during its above mentioned movement, and consequently the speed of rotation of the pinions 16 and 9 and of the worm 5, have the tendency to increase, the said disk 20 traveling on greater and greater friction circumferences. At the same time, a tangential strain or effort is transmitted to the worm 5. This effort added to the effort already being applied by the worm wheel 11 causes the worm 5 to rotate relatively to the driving shaft and thus by reason of the opposite hand of the threads on the two worms and of the rotation of the wheels 10, 11, 14 and 15 consequent upon the rotation of the worm 5 causes a decrease in the speed of rotation of the box 3 and consequently of the driven shaft. The extent of this decrease in speed is of course determined by the position of the friction disk 20 on the disk 22. By bringing the friction disk 20 nearer to the axis of the spindle 1, the same phases are reproduced, but in the opposite direction. The two worms 4 and 5 being non-reversible, by reasoning in the same way as before, it will be seen that the engine is always solid with the car. When, for instance, on going downhill, the car, which begins to drive, operates the engine, the proportion between the speeds will be still determined, like in the case when it is the engine which drives the car, by the position of the friction disk 20 on the disk 22.

In the construction with friction cones shown in Fig. 3, it must be pointed out that, like in the preceding construction, the worm 5 is subjected to a tangential strain or effort, caused by the spindle 1 and the worm 4. That is to say the worm 4 tends to rotate the worm wheel 10, which tends to rotate the wheel 11, and which in turn tends to rotate the worm 5. This, however, it is unable to do for the reason hereinbefore indicated, and consequently the parts rotate solid with the driving shaft and no differential movement is effected. If, however, by means of the lever 28 and the spring 29, an effort is exercised by the male cone 27 on the female cone 25, there is at once produced an effort tangential to the worm 5 in the same direction as that produced by the engine by means of the wheel 11. This combined effort causes the worm 5 to rotate relatively to the driving shaft and by reason of the fact the worms are of the same hand and of the rotation of the wheels 10, 11, 14 and 15, consequent upon the rotation of the worm 5 produces a reduction of speed which varies with the effort exercised on the lever. To the complete locking of the cones 27 25 corresponds the smallest speed of the vehicle, and by decreasing the effort exercised on the lever 28, the speed is increased. The spring 29 inserted between the lever 28 and the male cone 27, makes it possible to obtain with a reliable precision a progression in the variation of the speed of the car.

What I claim as my invention and desire to secure by Letters Patent is:—

1. In a transmission gearing the combination of a driving shaft, a driven shaft, a worm fixed on the driving shaft, a second worm loosely mounted on said shaft, means connected with the driven shaft to transmit motion from one worm to another, and means for causing the loose worm to rotate relatively to the driven shaft.

2. In transmission gearing the combination of a driving shaft, a driven shaft, a worm fixed on the driving shaft, a second worm loosely mounted on said shaft, a box rigidly connected to the driven shaft, means mounted in said box to transmit motion from one worm to another, and means for causing the loose worm to rotate relatively to the driven shaft.

3. In transmission gearing the combination of a driving shaft, a driven shaft, a worm fixed on the driving shaft, a second worm loosely mounted on said shaft, a box rigidly connected to the driven shaft, a worm wheel mounted in said box and engaging the fixed worm, a second worm wheel also mounted in the box and engaging the loose worm, gearing connecting the spindles of said worm wheels, and means for causing the loose worm to rotate relatively to the driven shaft.

4. In transmission gearing the combination of a driving shaft, a driven shaft, a worm fixed on the driving shaft, a second worm with a thread of opposite hand loosely mounted on said shaft, gearing connecting the two worms and carried on an extension of the driven shaft, a disk on the driven shaft, a second disk rotated by contact with the first disk, means for varying the position of the point of contact of the second disk, and means to transmit the motion of the second disk to the loose worm.

5. In transmission gearing the combination of a driving shaft, a driven shaft, a worm fixed on the driving shaft, a second worm with a thread of opposite hand loosely mounted on said shaft, a worm-wheel engaging with each worm, gearing connecting the two worm-wheels, a box rigidly connected to the driven shaft, spindles mounted in said box to carry the worm-wheels and gearing, a bevel wheel rigidly connected to the loose worm, a spindle mounted at right angles to the driving shaft, a second bevel wheel mounted thereon and engaging with the first named bevel wheel, a friction wheel rotating with said spindle but axially movable thereon, a disk on the driven spindle in contact with the friction wheel and means for moving the said friction wheel radially on the said disk.

In testimony whereof I have signed my name to this specification in the presence of two subscribing witnesses.

EDME BONNEAU.

Witnesses:
G. CARIVUR,
L. PAUGOMY.